United States Patent
Bellissimo et al.

(10) Patent No.: US 12,515,288 B2
(45) Date of Patent: Jan. 6, 2026

(54) INSULATION INSTALLATION SYSTEM AND METHOD OF INSTALLING INSULATION IN A WALL STRUCTURE FOR A MODULAR CONSTRUCTION UNIT

(71) Applicant: Buildz, LLC, Forest City, NC (US)

(72) Inventors: Mark Joseph Bellissimo, Wellington, FL (US); Stanley Clark Beard, Jr., Hendersonville, NC (US); Harrison Grant Meadows, Hendersonville, NC (US); Benjamin Austin Tucker, Boiling Springs, SC (US)

(73) Assignee: Buildz, LLC, Forest City, NC (US)

( * ) Notice: Subject to any disclaimer, the term of this patent is extended or adjusted under 35 U.S.C. 154(b) by 0 days.

(21) Appl. No.: 19/029,165

(22) Filed: Jan. 17, 2025

(65) Prior Publication Data

US 2025/0235969 A1    Jul. 24, 2025

Related U.S. Application Data

(60) Provisional application No. 63/622,365, filed on Jan. 18, 2024.

(51) Int. Cl.
  *B23P 19/00* (2006.01)
  *B23P 21/00* (2006.01)
  (Continued)

(52) U.S. Cl.
  CPC .............. *B23Q 5/52* (2013.01); *B23P 19/008* (2013.01); *B23P 21/004* (2013.01);
  (Continued)

(58) Field of Classification Search
  CPC .... B23P 19/008; B23P 21/004; E04B 1/7604; E04B 1/7608; E04G 21/16; B25J 11/005; Y10T 29/49629; B23Q 5/52
  See application file for complete search history.

(56) References Cited

U.S. PATENT DOCUMENTS

| | | | |
|---|---|---|---|
| 7,866,105 B2 * | 1/2011 | Babbitt | B32B 11/06 52/407.3 |
| 2008/0086978 A1 * | 4/2008 | Gilgan | E04B 1/34336 52/749.1 |

(Continued)

FOREIGN PATENT DOCUMENTS

EP    4134215 A1    2/2023

OTHER PUBLICATIONS

International Search Report and Written Opinion directed to PCT/US2025/012088 mailed May 14, 2025.

(Continued)

*Primary Examiner* — Jermie E Cozart
(74) *Attorney, Agent, or Firm* — Michele V. Frank; Venable LLP

(57) ABSTRACT

An insulation installation system and method of installing insulation in a wall structure for a modular construction unit. The insulation installation system includes an insulation in-feed table, an insulation out-feed table, an insulation saw assembly, and an insulation unload tool. The insulation in-feed table moves a batt of insulation thereon. The insulation out-feed table receives the batt of insulation from the insulation in-feed table. The insulation saw assembly includes an insulation saw that cuts the batt of insulation into a cut insulation having a size to fit into a wall cavity of the wall structure. The insulation unload tool grabs the cut insulation from the insulation out-feed table and places the cut insulation into the wall cavity of the wall structure.

30 Claims, 12 Drawing Sheets

(51) Int. Cl.
*B23Q 5/52* (2006.01)
*B25J 11/00* (2006.01)
*E04B 1/76* (2006.01)
*E04B 2/00* (2006.01)
*E04G 21/16* (2006.01)

(52) U.S. Cl.
CPC .......... *E04B 1/7608* (2013.01); *B25J 11/005* (2013.01); *E04B 1/7604* (2013.01); *E04C 2/46* (2013.01); *E04G 21/16* (2013.01); *Y10T 29/49629* (2015.01)

(56) References Cited

U.S. PATENT DOCUMENTS

| | | | | |
|---|---|---|---|---|
| 2010/0011701 A1* | 1/2010 | Cole | ................ | B26D 3/008 |
| | | | | 52/749.1 |
| 2011/0016694 A1* | 1/2011 | Gilgan | ................ | E04B 1/34336 |
| | | | | 29/430 |
| 2013/0074343 A1* | 3/2013 | Newkirk | ................ | E04C 2/52 |
| | | | | 29/897.32 |
| 2013/0174700 A1* | 7/2013 | Cole | ................ | B23D 49/00 |
| | | | | 83/13 |
| 2015/0013163 A1* | 1/2015 | Martens | ................ | B25C 1/06 |
| | | | | 173/90 |

OTHER PUBLICATIONS

Randek, "Zerolabor robotic system",,Jan. 4, 2024 (Jan. 4, 2024), pp. 1-15, XP093273571; [retrieved on Apr. 29, 2025].

Randek, "Automated prefabricated Wall element production with ZeroLabor Robotic Systems.",, Jan. 4, 2024 (Jan. 4, 2024), XP093273572, [retrieved on Apr. 29, 2025].

* cited by examiner

INSULATION INSTALLATION SYSTEM AND METHOD OF INSTALLING INSULATION IN A WALL STRUCTURE FOR A MODULAR CONSTRUCTION UNIT

CROSS REFERENCE TO RELATED APPLICATIONS

This application claims the benefit of U.S. Provisional Patent Application No. 63/622,365, filed on Jan. 18, 2024, the entire contents of which is hereby incorporated by reference in its entirety.

TECHNICAL FIELD

The present disclosure relates generally to construction of modular construction units. In particular, the present disclosure relates to an insulation installation system and method of installing insulation in a wall structure for a modular construction unit.

BACKGROUND

The production of modular, or prefabricated, buildings is a growing industry. In this type of manufacturing, sections of a building or structure, also referred to as a modular construction unit, are partially assembled at a remote location, and the sections are then delivered to the final building site, where final construction of the structure is ultimately completed by assembling the various sections together. Such modular construction units can be used for a variety of purposes, including, for example, as temporary or permanent buildings, such as residential homes, commercial offices, educational or service facilities, etc. Wall structures of the modular construction unit may require insulation installed within the wall structures for insulating the modular construction unit.

SUMMARY

An insulation installation system for installing insulation in a wall structure for a modular construction unit. The insulation installation system includes an insulation in-feed table that moves a batt of insulation thereon, an insulation out-feed table that receives the batt of insulation from the insulation in-feed table, an insulation saw assembly comprising an insulation saw that cuts the batt of insulation into a cut insulation having a size to fit into a wall cavity of the wall structure, and an insulation unload tool that grabs the cut insulation from the insulation out-feed table and places the cut insulation into the wall cavity of the wall structure.

A method of installing insulation in a wall structure for a modular construction unit. The method includes: moving, by an insulation in-feed table, a batt of insulation thereon, receiving, by an insulation out-feed table, the batt of insulation from the insulation in-feed table, cutting, by an insulation saw of an insulation saw assembly, the batt of insulation into a cut insulation having a size to fit into a wall cavity of the wall structure, and grabbing, by an insulation unload tool, the cut insulation from the insulation out-feed table and placing the cut insulation into the wall cavity of the wall structure.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
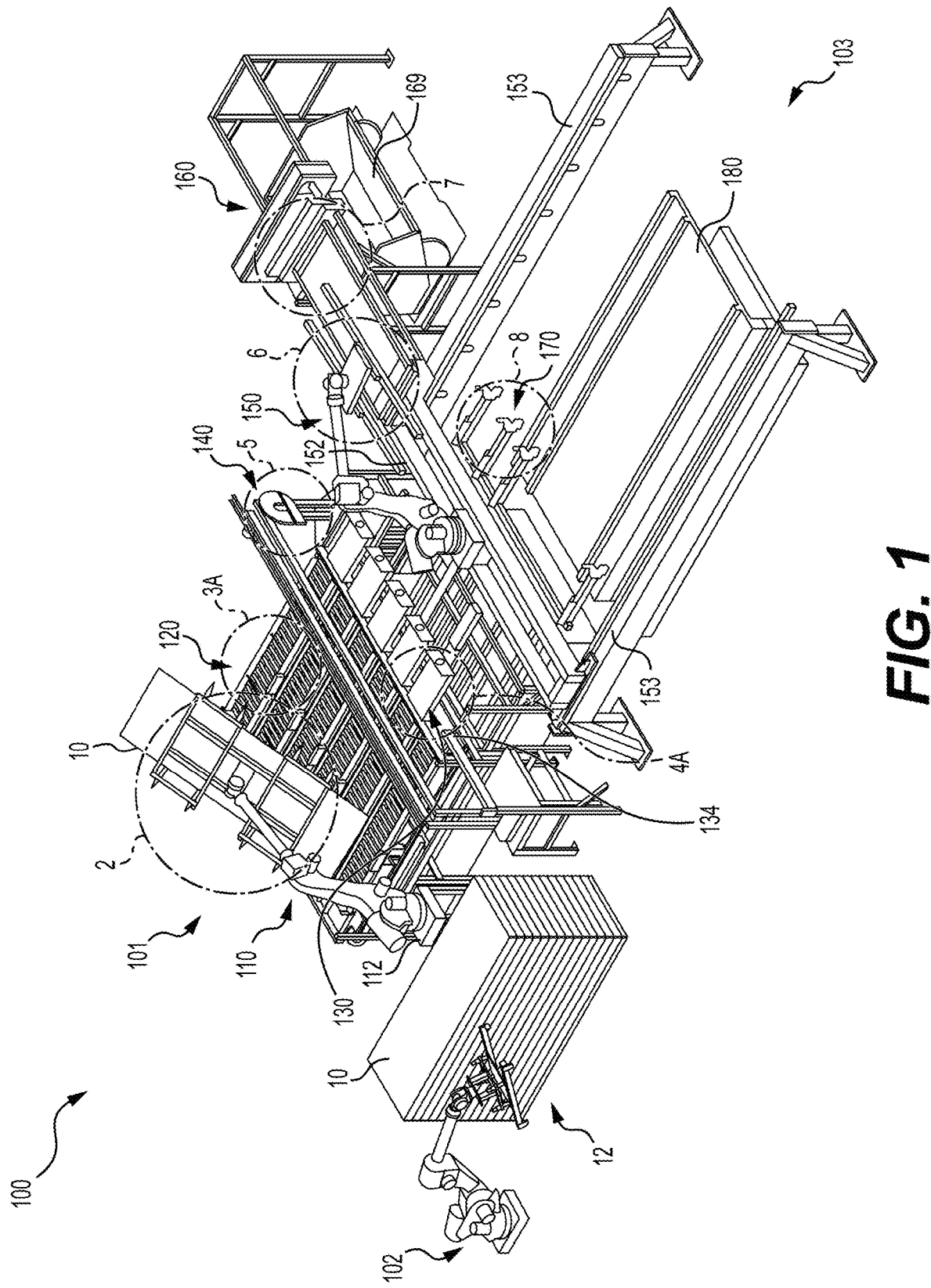
FIG. 1 is a perspective view of an insulation installation system for installing insulation in a wall structure for a modular construction unit, according to the present disclosure.

Various embodiments are discussed in detail below. While specific embodiments are discussed, this is done for illustration purposes only. A person skilled in the relevant art will recognize that other components and configurations may be used without departing from the present disclosure.

As used herein, the terms "first" and "second," etc., may be used interchangeably to distinguish one component from another and are not intended to signify location or importance of the individual components.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

As mentioned above, wall structures of modular construction units may require insulation. Insulating the wall structures for a building has various challenges depending on the type of insulation and the construction of the building. A common problem that occurs in insulating the wall structures is poor installation of the insulation material in the wall structure. Poor installation of the insulation can lead to various problems, such as, for example, temperature variations in the wall structures, high energy bills due to poor insulation, condensation in the wall structures or in the building through the wall structures, moisture in the wall structures, and noise transmission through the wall structure. Installing insulation by hand can require considerable effort and time and can pose certain risks, such as, for example, cuts or skin irritation. Further, wall structures need to be insulated with consistency and accuracy in order to ensure proper insulation of the wall structures.

Accordingly, the present disclosure provides an automated insulation installation system to install insulation within the wall structures. The automated insulation installation system improves consistency, accuracy, and time it takes to manufacture the wall structures, while minimizing human health risks. Insulation is first loaded into the automated insulation installation system by a load robot with a specially designed tool for grabbing single batts of insulation and loading a batt of insulation onto an in-feed table. From there, the batt of insulation is squared on the in-feed table and advanced towards an out-feed table. As the batt of insulation advances, an insulation saw cuts the insulation to size to fit within a wall cavity of the wall structure. In particular, the insulation saw cuts the insulation such that the length and/or the width of the insulation is greater than the length and/or the width of the wall cavity, respectively. In this way, the insulation is installed into the wall cavity with a tight and exacting fit.

The cut insulation is then unloaded by a specially designed tool, also referred to as an unload robot, to grab the cut insulation and insert the cut insulation into the wall cavity. As a wall structure progresses down an assembly line into the automated insulation installation system, a dynamic wall stop moves to ensure the wall structure is in a proper location and position to be insulated (to receive the cut insulation within the wall cavity). Any scrap insulation material is passed to an insulation scrap removal assembly, sawed into smaller pieces, and disposed of or recycled back into the system to generate a batt of insulation with the recycled scrap insulation material. The automated insulation installation system of the present disclosure, thus, ensures that the wall structures are insulated with consistency and accuracy, thereby properly insulating the wall structures. Further, the insulation installation system reduces waste and yields a higher quality insulated wall with fewer deficiencies and at a much faster time as compared to insulation installation systems without the benefit of the present disclosure.

Referring now to the drawings, FIG. 1 is a perspective view of an insulation installation system 100 for installing insulation 10 in a wall structure for a modular construction unit, according to the present disclosure. The wall structure can be constructed in a system for creating the wall structures for use in creating a modular construction unit. The modular construction unit is, for example, a modular room that is built in a factory, transported in a substantially assembled state to a construction site, and secured to form a larger building, such as, for example, a hotel constructed from a plurality of such modular construction units. By way of example, the system for creating the wall structures may be the system described in U.S. Patent Application Publication No. US2021/0187783, the contents of which are hereby incorporated by reference in their entirety. The insulation installation system 100 can be included in the system for installing insulation within wall cavities of the wall structures. The insulation can be any suitable material, including, for example, a cellulose material having a predetermined moisture content to achieve a desired insulation density within each wall cavity.

As shown in FIG. 1, the insulation installation system 100 includes a first end 101, also referred to as a proximal end, and a second end 103, also referred to as a distal end. The insulation installation system 100 includes a pallet removal robot 102, an insulation load tool 110, an insulation in-feed table 120, an insulation out-feed table 130, an insulation saw assembly 140, an insulation unload tool 150, an insulation scrap removal assembly 160, and a dynamic wall stop, also referred to as a wall stop assembly 170. The insulation installation system 100 can also include a wall conveyor 180 (shown schematically in FIG. 1) for moving wall structures into and out of the insulation installation system 100, as detailed further below.

A bunk or a stack 12 of insulation 10 is conveyed or otherwise transferred to the insulation installation system 100 on a pallet (e.g., from the insulation loading station of U.S. Patent Application Publication No. US2021/0187783). Batts of insulation 10 are stacked on the pallet in the stack 12. The batts of insulation 10 are removed from the stack 12 and placed onto the insulation installation system 100, as detailed further below. Once the pallet is empty (e.g., all of the batts of insulation 10 are removed from the stack 12), the pallet removal robot 102 removes the empty pallet so that a new pallet of insulation 10 can be placed for loading the batts of insulation 10 onto the insulation installation system 100.

In general, the insulation load tool 110 grabs a batt of insulation 10 from the stack 12 and loads the batt of insulation 10 onto the insulation in-feed table 120. The insulation load tool 110 squares the batt of insulation 10 on the insulation in-feed table 120. The insulation in-feed table 120 advances the batt of insulation 10 towards the insulation out-feed table 130. As the batt of insulation 10 advances, the insulation saw assembly 140 cuts the insulation 10 to a size to fit within the wall structure (e.g., between studs of the wall structure), as detailed further below. The insulation unload tool 150 unloads the cut insulation 10 and inserts the insulation 10 into a wall cavity of the wall structure. In this way, the insulation installation system 100 moves the insulation 10 from the first end 101 towards the second end 103 to be installed into a wall structure. Scrap insulation from the cut insulation 10 is passed to the insulation scrap removal assembly 160 and sawed into smaller pieces for removing the scrap insulation. The wall structure is advanced from the second end 103 towards the first end 101 on one or more wall conveyors 180. The wall stop assembly 170 is actuated to stop the wall structure within the insulation installation system 100 to ensure the wall structure is in a proper location to be insulated with the insulation 10. The insulation load tool 110, the insulation in-feed table 120, the insulation out-feed table 130, the insulation saw assembly 140, the insulation unload tool 150, the insulation scrap removal assembly 160, and the wall stop assembly 170 are detailed further below with respect to FIGS. 2 to 8, respectively.

Figure 2:
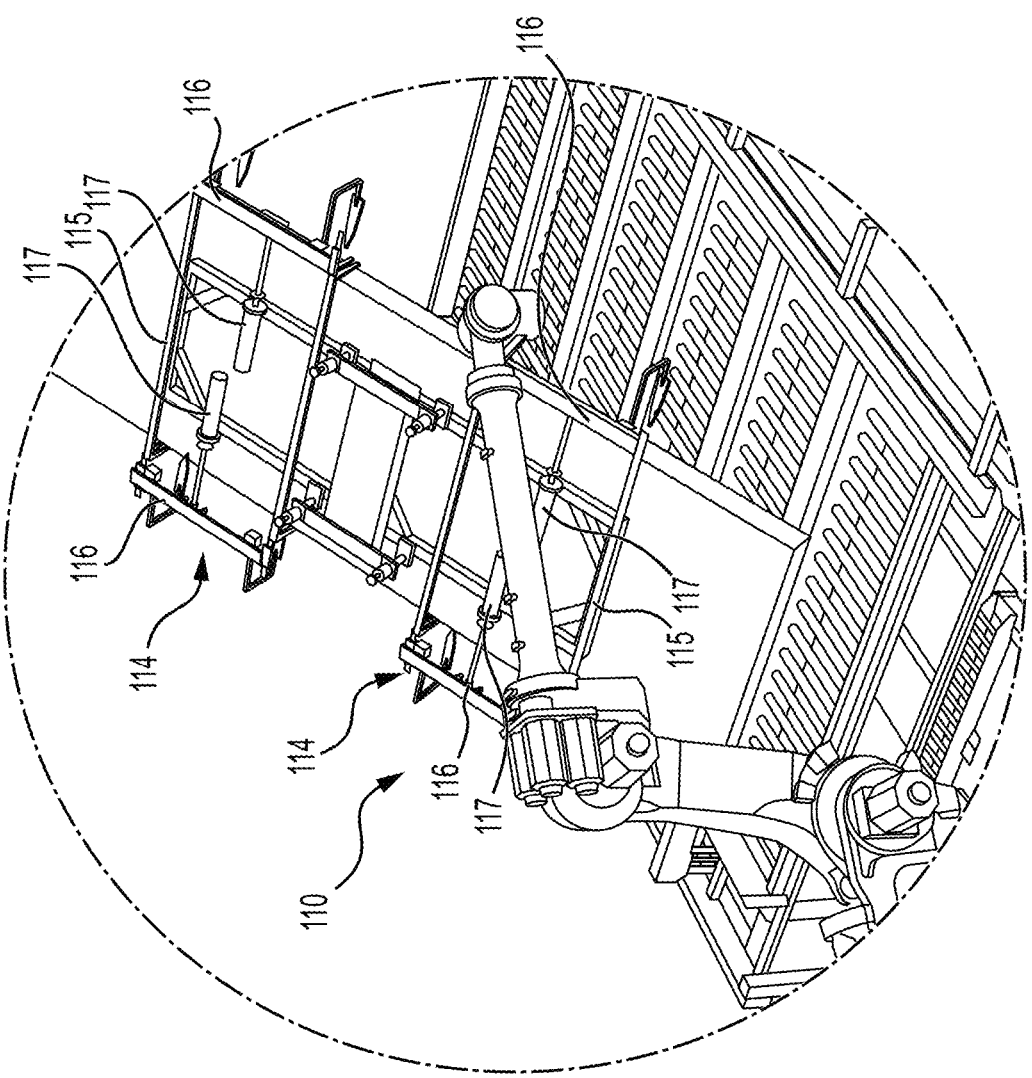
FIG. 2 is an enlarged view of an insulation load tool of the insulation installation system, taken at detail 2 in FIG. 1, according to the present disclosure.

FIG. 2 is an enlarged view of the insulation load tool 110 of the insulation installation system 100, taken at detail 2 in FIG. 1, according to the present disclosure. The insulation load tool 110 is an automated robot positioned on, and attached to, a support pedestal 112 (FIG. 1). The support pedestal 112 is arranged at a height such that the insulation load tool 110 can grab a batt of the insulation 10 from the stack 12 and place the insulation 10 on the insulation in-feed table 120. The insulation load tool 110 (e.g., the automated robot) can be any suitable type of automated robot device, system, apparatus, etc. In particular, the insulation load tool 110 is a 6-axis robotic arm having an insulation grabbing tool 114 attached at a distal end of the insulation load tool 110 (e.g., a distal end of the robotic arm). The insulation grabbing tool 114 includes a static frame 115 and one or more extendable arms 116 slidably coupled to the static frame 115. The extendable arms 116 are arranged on the static frame 115 such that the extendable arms 116 can be extended transversely from the static frame 115 and retracted to grab, and to hold, a batt of insulation 10.

The insulation load tool 110 includes one or more actuators 117 drivingly coupled to the extendable arms 116. The one or more actuators 117 can include any type of actuator that can be controlled by the insulation load tool 110 to extend and to retract the extendable arms 116. For example, the one or more actuators 117 can include electrical actuators, pneumatic actuators, hydraulic actuators, or the like.

In operation, the insulation load tool 110 rotates to engage a batt of insulation 10 from the stack 12. The insulation load tool 110 lowers the insulation grabbing tool 114 to engage with the batt of insulation 10. When the insulation grabbing tool 114 is engaged with the batt of insulation 10, the insulation load tool 110 retracts the extendable arms 116 such that the extendable arms 116 engage the batt of insulation 10 and grab the batt of insulation 10. In particular, the insulation load tool 110 controls the actuators 117 to retract the actuators 117, thereby retracting the extendable arms 116 about the insulation 10. The insulation load tool 110 then lifts the batt of insulation 10, rotates towards the insulation in-feed table 120, and places the insulation 10 on the insulation in-feed table 120. The insulation load tool 110 then extends the extendable arms 116 to disengage from the insulation 10. In particular, the insulation load tool 110 controls the actuators 117 to extend the actuators 117, thereby extending the extendable arms 116. Thus, the insulation load tool 110 places the insulation 10 onto the insulation in-feed table 120. The insulation load tool 110 can then grab another batt of insulation 10 to place onto the insulation in-feed table 120.

Figure 3A:
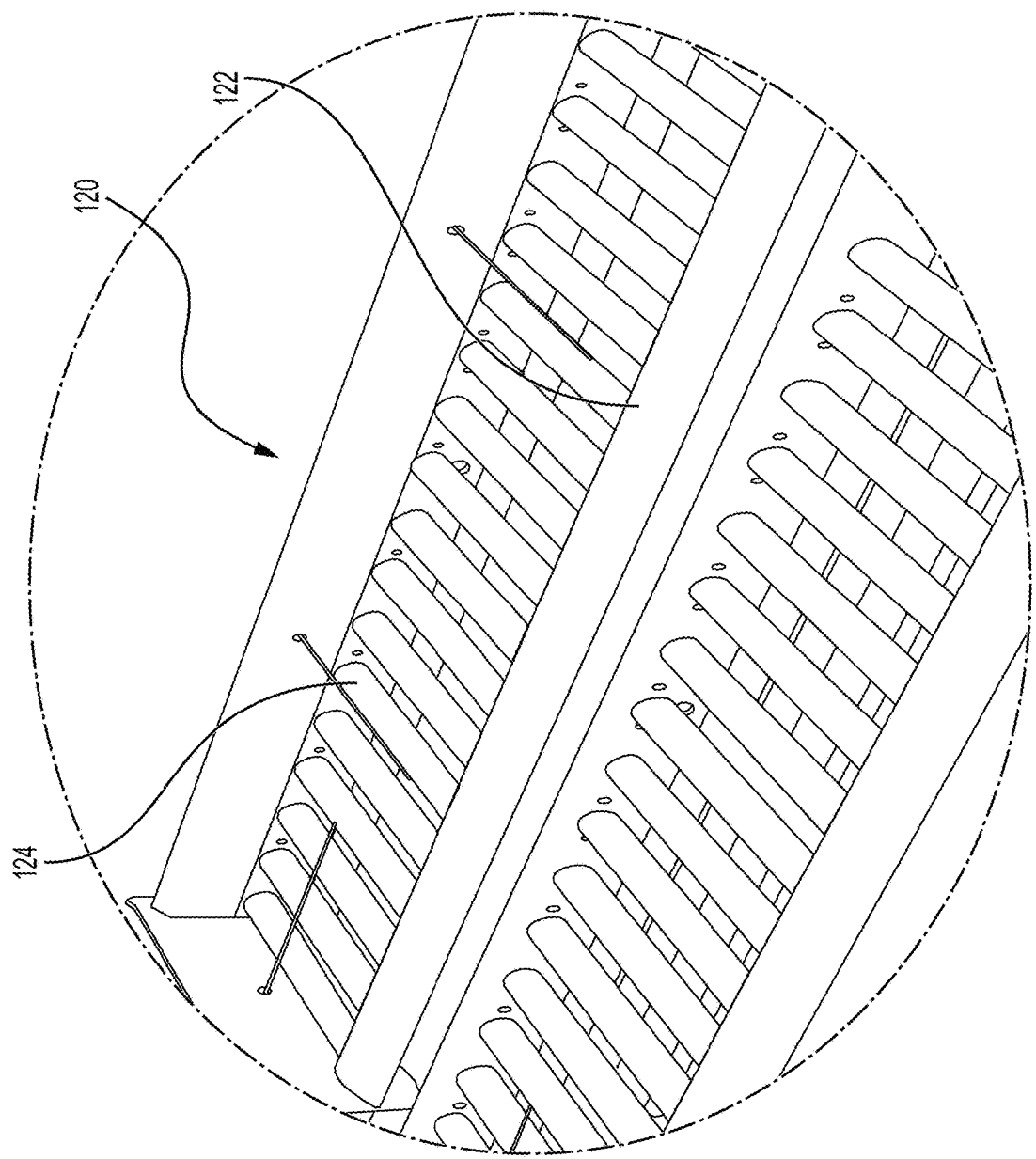
FIG. 3A is an enlarged view of an insulation in-feed table of the insulation installation system, taken at detail 3A in FIG. 1, according to the present disclosure.
Figure 3B:
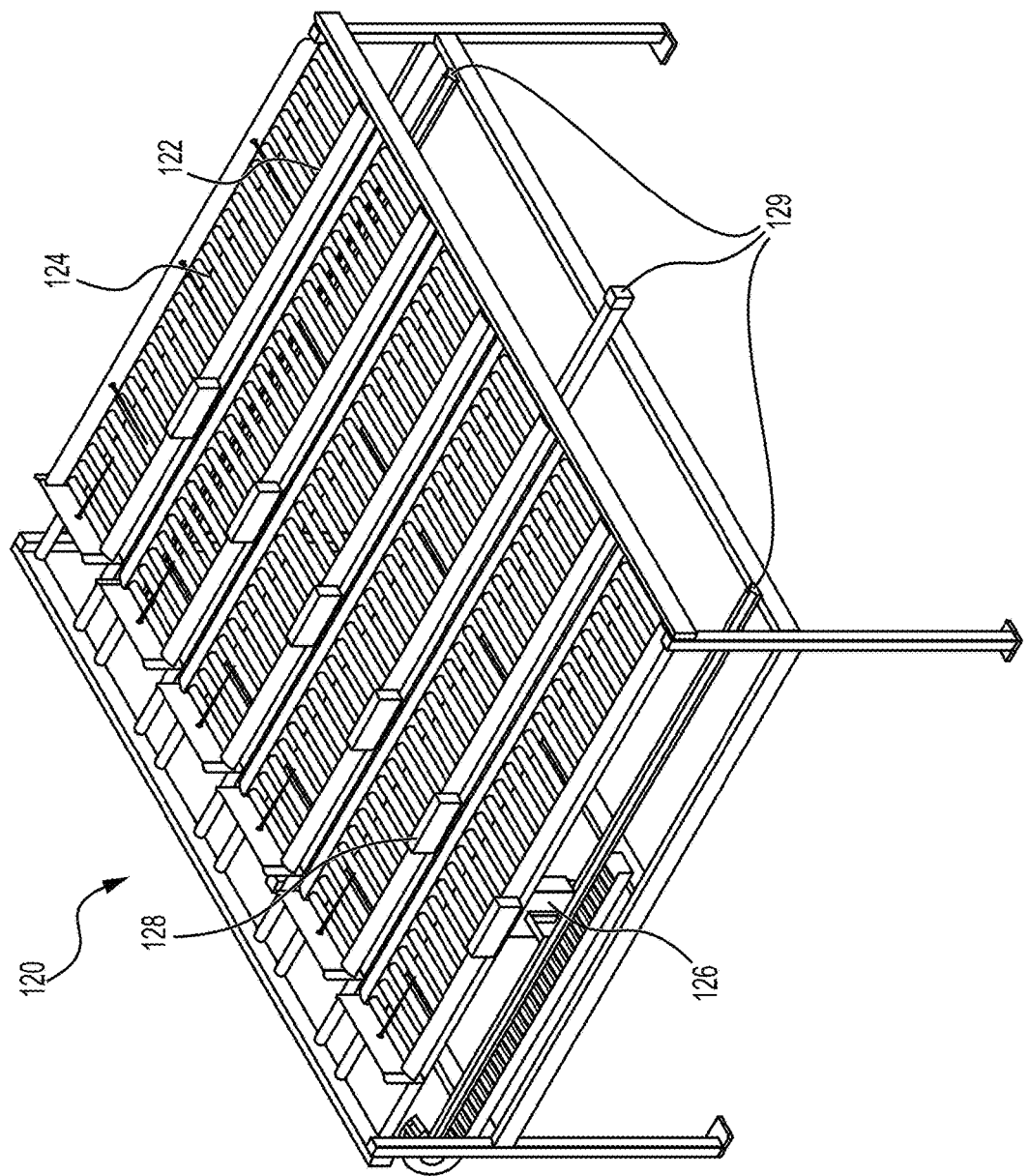
FIG. 3B is a perspective view of the insulation in-feed table isolated from the insulation installation system, according to the present disclosure.

FIG. 3A is an enlarged view of the insulation in-feed table 120 of the insulation installation system 100, taken at detail 3A in FIG. 1, according to the present disclosure. FIG. 3B is a perspective view of the insulation in-feed table 120 isolated from the insulation installation system 100, according to the present disclosure. The insulation in-feed table 120 includes a plurality of tracks 122 and a plurality of rollers 124. The insulation in-feed table 120 also includes an in-feed table conveyor 126 having one or more in-feed table conveyor arms 128. The in-feed table conveyor 126 is mounted on one or more conveyor tracks 129. The in-feed table conveyor arms 128 are positioned to contact the batt of insulation 10 on the insulation in-feed table 120 (on the plurality of tracks 122). The one or more conveyor tracks 129 move the in-feed table conveyor 126 thereon, thereby moving the one or more in-feed table conveyor arms 128 in order to square and to move the batt of insulation 10 on the insulation in-feed table 120.

Additionally, or alternatively, the plurality of tracks 122 can comprise, for example, chain-driven conveyors that move the insulation 10 thereon. The tracks 122 can be driven by a common driveshaft to ensure that each track moves in unison and the insulation 10 moving thereon is not skewed to any substantial degree during transit along the insulation in-feed table 120. Additionally, or alternatively, the plurality of rollers 124 rotatably engage the insulation 10 on the insulation in-feed table 120 to allow the insulation in-feed table 120 to transport the insulation 10 thereon. The plurality of rollers 124 can include rollers 124 driven by a motor and/or can include rollers 124 that are idler rollers 124 (e.g., not directly driven by a motor, but free to rotate).

In operation, the insulation load tool 110 places the insulation 10 onto the plurality of tracks 122 and/or the plurality of rollers 124 of the insulation in-feed table 120. The insulation in-feed table 120 moves the in-feed table conveyor 126 along the one or more conveyor tracks 129 to move the one or more in-feed table conveyor arms 128 from the first end 101 towards the second end 103. In particular, the insulation in-feed table 120 moves the insulation 10 from the first end 101 towards the second end 103. Thus, the insulation in-feed table 120 moves the insulation 10 to the insulation out-feed table 130. Additionally, or alternatively, the insulation in-feed table 120 controls the plurality of tracks 122 (e.g., the driveshaft) and/or the plurality of rollers 124 (e.g., the motor) to move the insulation 10 along the insulation in-feed table 120.

Figure 4A:
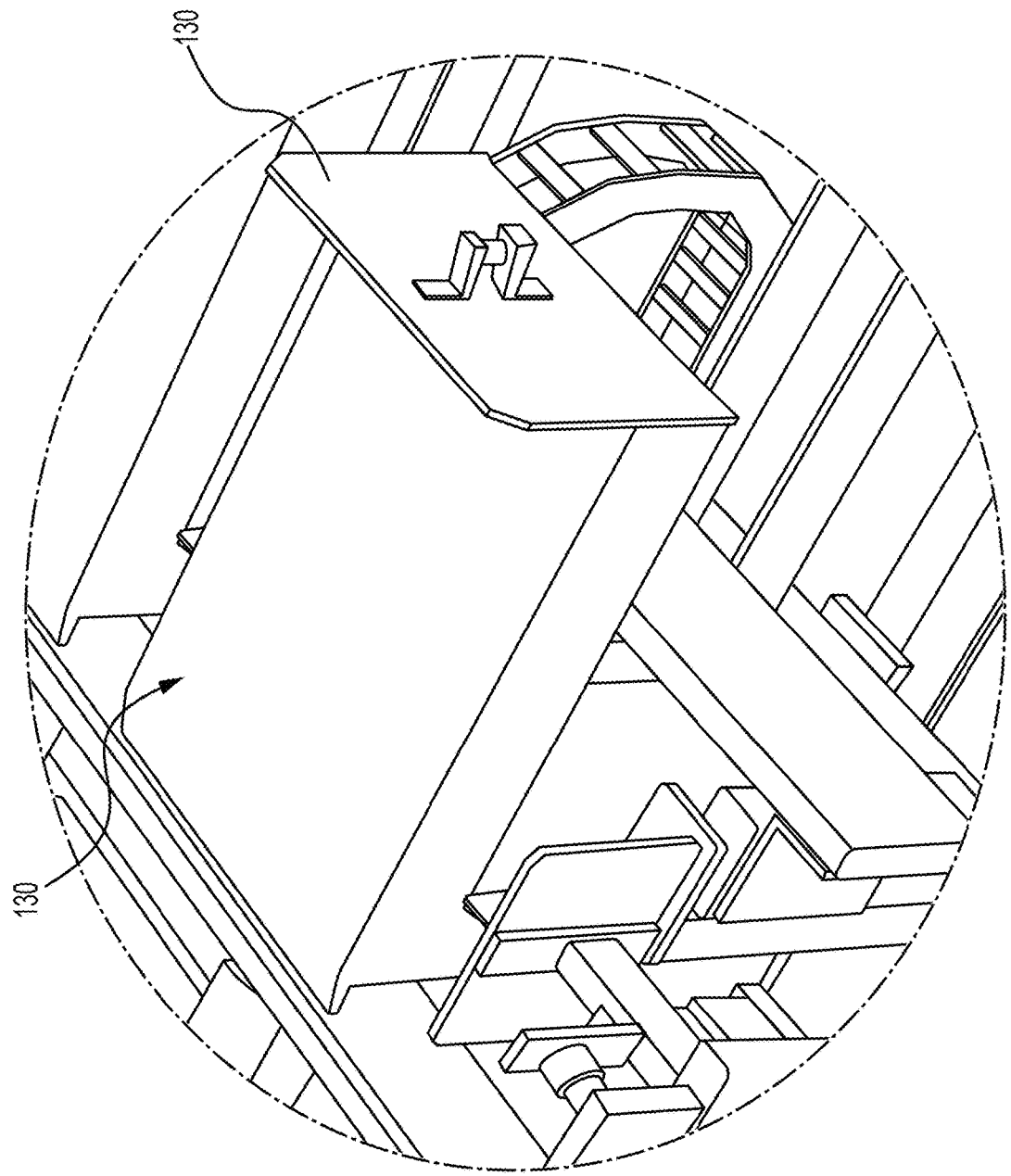
FIG. 4A is an enlarged view of an insulation out-feed table of the insulation installation system, taken at detail 4A in FIG. 1, according to the present disclosure.
Figure 4B:
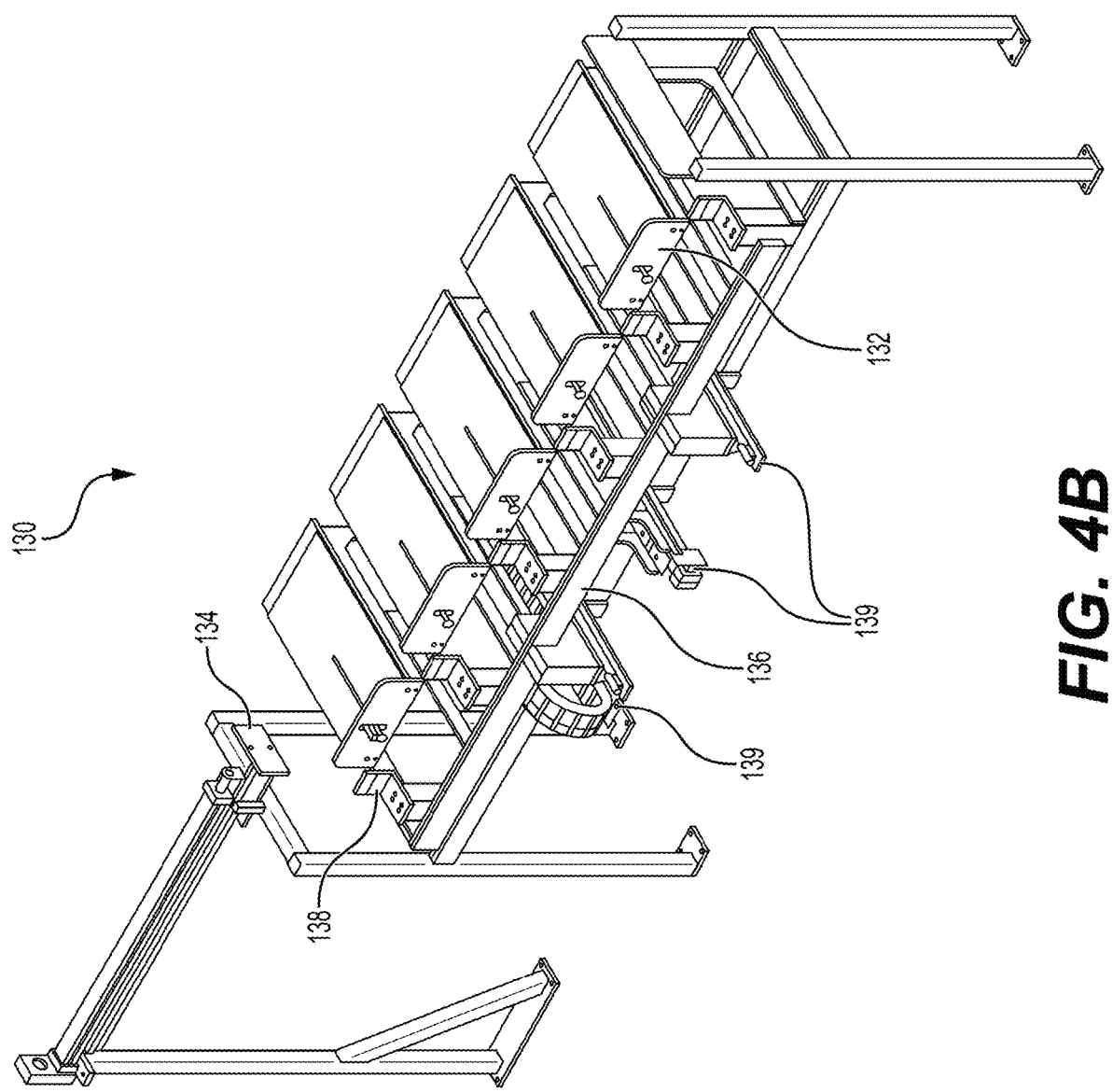
FIG. 4B is a perspective view of the insulation out-feed table isolated from the insulation installation system, according to the present disclosure.

FIG. 4A is an enlarged view of the insulation out-feed table 130 of the insulation installation system 100, taken at detail 4A in FIG. 1, according to the present disclosure. FIG. 4B is a perspective view of the insulation out-feed table 130 isolated from the insulation installation system 100, according to the present disclosure. The insulation out-feed table 130 includes a generally flat surface and one or more vertical stopper walls 132. The vertical stopper walls 132 extend vertically upward (in the orientation shown in FIG. 1) from the generally flat surface. The one or more vertical stopper walls 132 stop the insulation 10 on the insulation out-feed table 130 such that the one or more vertical stopper walls 132 prevent the insulation 10 from moving beyond the vertical stopper walls 132. In this way, the insulation out-feed table 130 receives the insulation 10 from the insulation in-feed table 120 and stops the insulation 10 thereon to prevent the insulation 10 from continuing to move towards the second end 103. When the insulation 10 is stopped on the insulation out-feed table 130, the insulation saw assembly 140 engages the insulation 10 to cut the insulation 10. The insulation out-feed table 130 also includes an insulation stopper 134 that prevents the insulation 10 from moving laterally along the insulation out-feed table 130 as the saw assembly 140 moves to cut the insulation 10.

The insulation out-feed table 130 also includes an out-feed table conveyor 136 having one or more out-feed table conveyor arms 138. The out-feed table conveyor 136 is mounted on one or more conveyor tracks 139. The out-feed table conveyor arms 138 are positioned to contact the batt of insulation 10 on the insulation out-feed table 130. The one or more conveyor tracks 139 move the out-feed table conveyor 136 thereon, thereby moving the one or more out-feed table conveyor arms 138 in order to square and to move the batt of insulation 10 on the insulation out-feed table 130. In particular, the out-feed table conveyor 136 moves the insulation 10 towards the insulation unload tool 150 after the insulation 10 has been cut by the insulation saw assembly 140.

Figure 5:
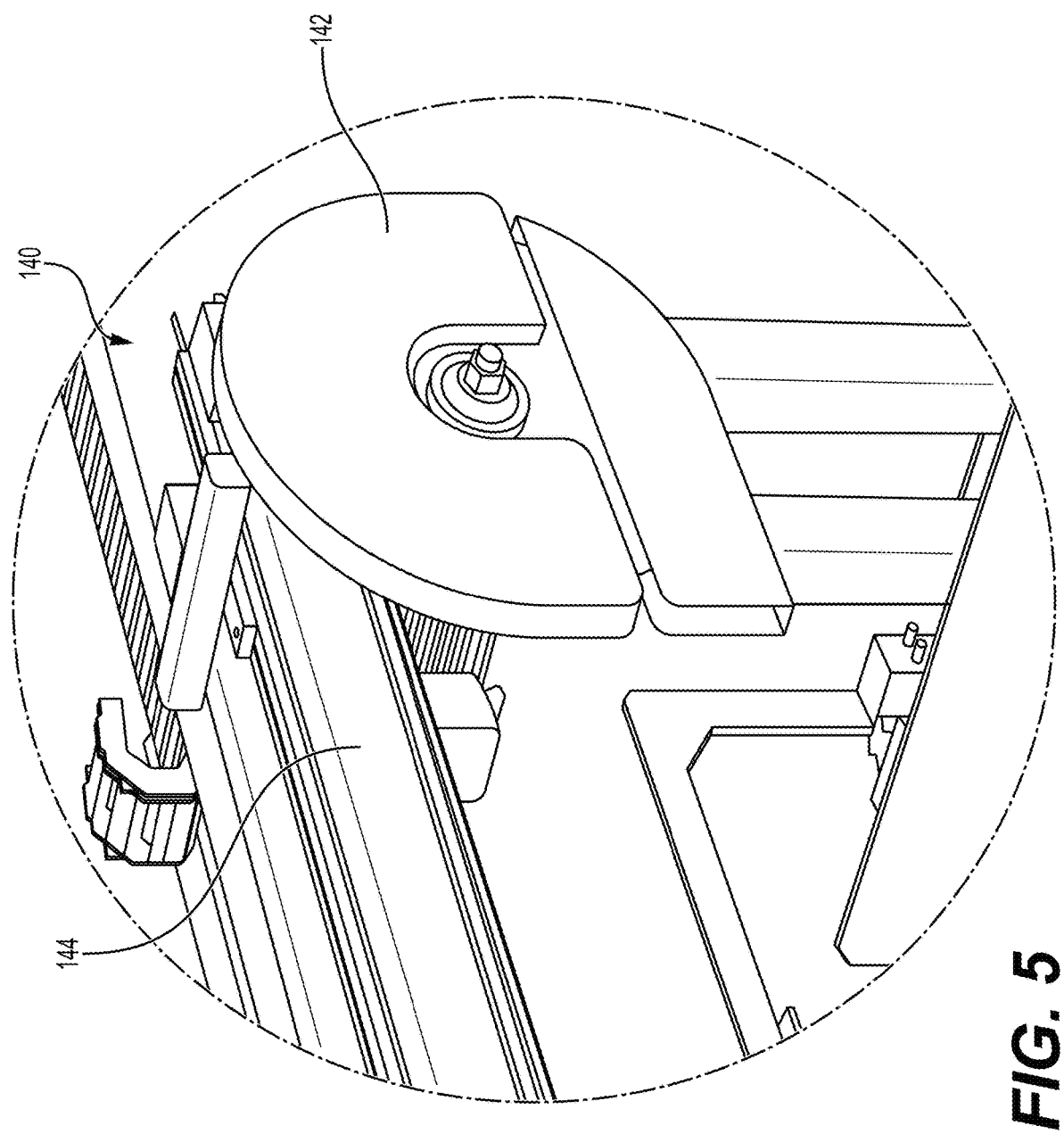
FIG. 5 is an enlarged view of an insulation saw assembly of the insulation installation system, taken at detail 5 in FIG. 1, according to the present disclosure.

FIG. 5 is an enlarged view of the insulation saw assembly 140 of the insulation installation system 100, taken at detail 5 in FIG. 1, according to the present disclosure. The insulation saw assembly 140 includes an insulation saw 142 movably mounted on one or more insulation saw tracks 144. The insulation saw tracks 144 are arranged above the insulation out-feed table 130 (in the orientation shown in FIG. 1) and extend along a width of (transversely to) the insulation out-feed table 130. In this way, the insulation saw 142 is movable on the insulation saw tracks 144 along the width of (e.g., across) the insulation out-feed table 130. The insulation saw assembly 140 lowers the insulation saw 142 to engage the insulation 10 and moves the insulation saw 142 along the insulation saw tracks 144 to cut the insulation 10. In some embodiments, the insulation saw tracks 144 and the insulation saw 142 are positioned at a height or a distance for cutting the insulation 10 such that the insulation saw 142 does not need to be lowered first to cut the insulation 10.

The insulation saw assembly 140 cuts the insulation 10 to a size to fit within the wall structure (e.g., in a respective wall cavity between studs of the wall structure). In particular, the insulation installation system 100 determines a size of the wall cavity of the wall structure (e.g., a wall cavity length and/or a wall cavity width of the wall cavity) and cuts the insulation 10 larger than the size of the wall cavity to achieve a tight fit of the insulation 10 in the respective wall cavity. For example, the insulation saw assembly 140 cuts the insulation 10 to be 0.5 inches larger than the wall cavity in which the insulation 10 will be installed. In this way, the cut insulation 10 includes an insulation length and/or an insulation width that is greater than the wall cavity length and/or the wall cavity width, respectively.

In some embodiments, the insulation saw assembly 140 moves the insulation saw 142 along the insulation saw tracks 144 to cut the insulation 10 as the insulation in-feed table 120 moves the insulation 10 onto the insulation out-feed table 130. The insulation unload tool 150 then engages the insulation 10 to move the insulation 10 into a wall cavity of the wall structure and moves scraps of cut insulation 10 onto the insulation scrap removal assembly 160.

Figure 6:
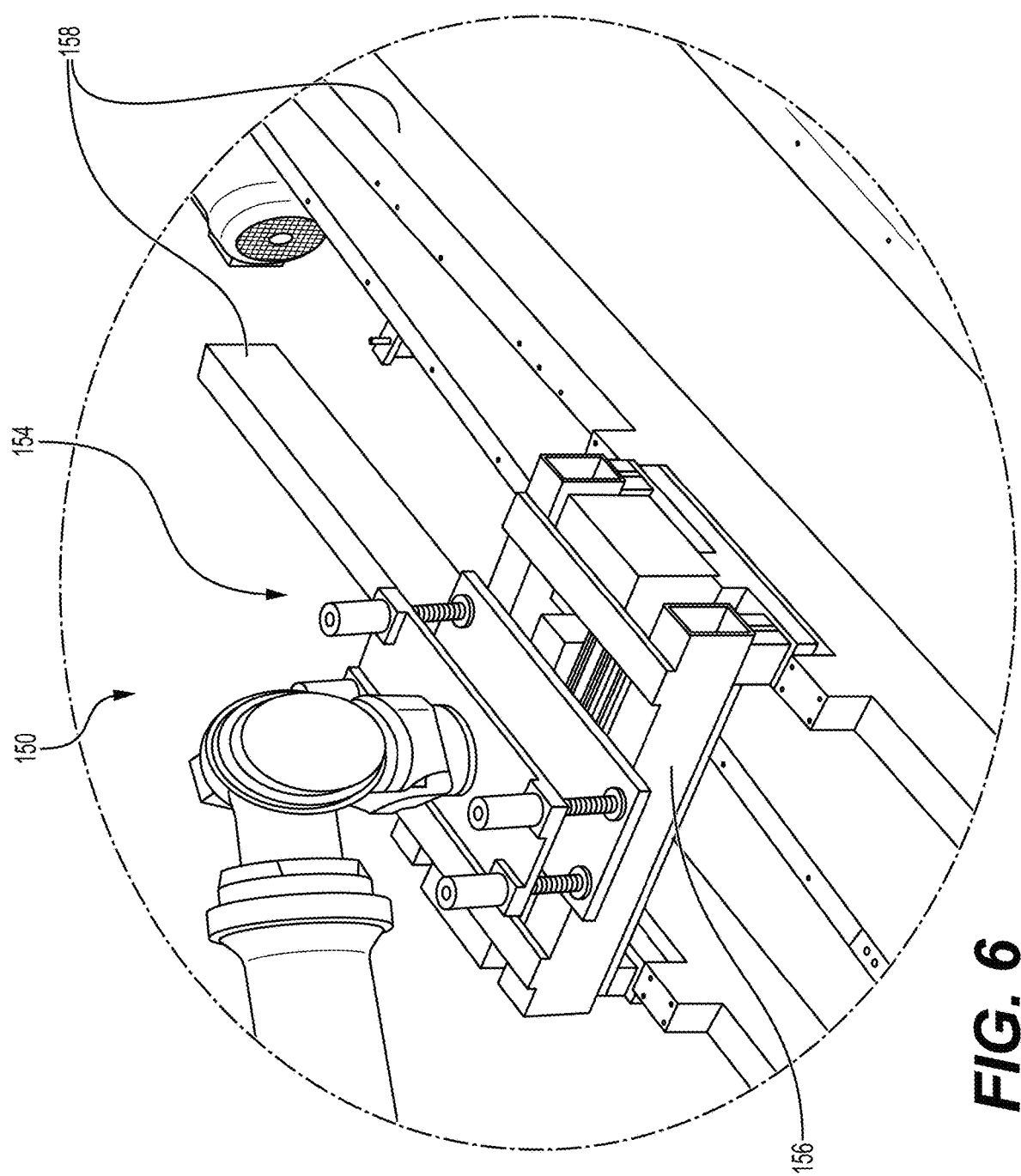
FIG. 6 is an enlarged view of an insulation unload tool of the insulation installation system, taken at detail 6 in FIG. 1, according to the present disclosure.

FIG. 6 is an enlarged view of the insulation unload tool 150 of the insulation installation system 100, taken at detail 6 in FIG. 1, according to the present disclosure. The insulation unload tool 150 is an automated robot positioned on, and attached to, one or more insulation unload tool tracks 152 (FIG. 1). The insulation unload tool tracks 152 are arranged at a height or a distance on one or more insulation unload tool frames 153 such that the insulation unload tool 150 can grab the insulation 10 from the insulation out-feed table 130 and place the insulation 10 into the wall cavity of the wall structure. The insulation unload tool 150 can also grab scraps of insulation to move the scraps of insulation onto the insulation scrap removal assembly 160 to dispose of the scraps of insulation.

The insulation unload tool 150 (e.g., the automated robot) can be any suitable type of automated robot device, system, apparatus, etc. In particular, the insulation unload tool 150 is a 6-axis automated robotic arm having an insulation grabbing tool 154 attached at a distal end of the robotic arm. The insulation grabbing tool 154 includes a static frame 156 and a plurality of frame arms 158 coupled to the static frame 156. The plurality of frame arms 158 includes two frame arms 158 that are spaced to grab a cut piece of insulation 10 when the insulation unload tool 150 engages the insulation 10. The frame arms 158 extend from the static frame 156 such that the frame arms 158 can grab the insulation 10. In some embodiments, the frame arms 158 can be extendable, for example, by one or more actuators, similar to the extendable arms 116 of the insulation load tool 110.

In operation, the insulation unload tool 150 (e.g., the one or more automated robots) rotate to engage the cut insulation 10 from the insulation out-feed table 130. The insulation unload tool 150 lowers the insulation grabbing tool 154 to engage with the cut insulation 10. When the insulation grabbing tool 154 is engaged with the cut insulation 10, the insulation unload tool 150 lifts the cut insulation 10, rotates towards the wall structure, and places the insulation 10 into the wall cavity of the wall structure. The insulation unload tool 150 disengages from the insulation 10. Thus, the insulation unload tool 150 places the insulation 10 into the wall cavity of the wall structure. The insulation unload tool 150 can also grab scraps of insulation 10 that are cut away from the insulation 10 and place the scraps onto the insulation scrap removal assembly 160 for disposing of the scraps.

Figure 7:
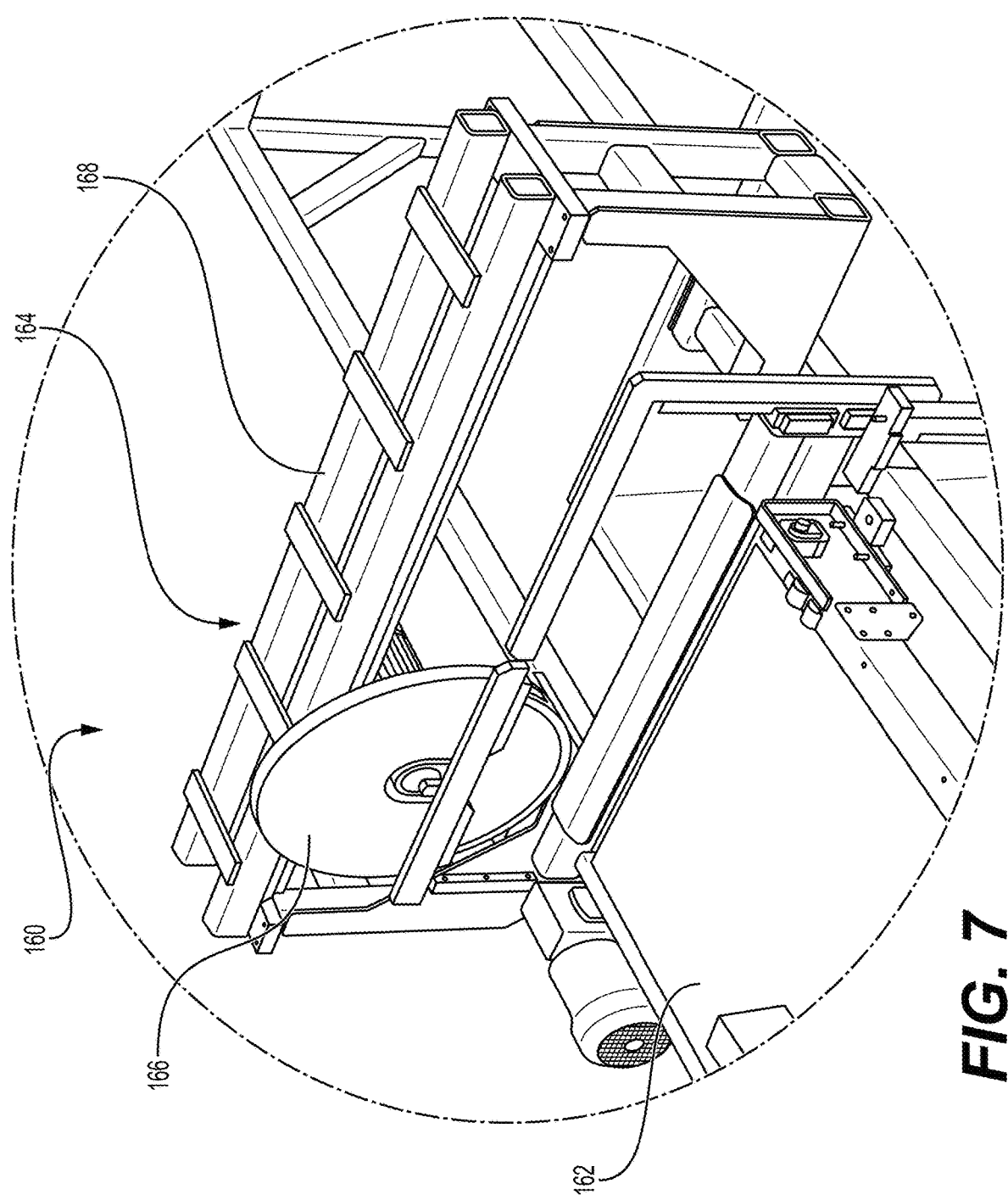
FIG. 7 is an enlarged view of an insulation scrap removal assembly of the insulation installation system, taken at detail 7 in FIG. 1, according to the present disclosure.

FIG. 7 is an enlarged view of the insulation scrap removal assembly 160 of the insulation installation system 100, taken at detail 7 in FIG. 1, according to the present disclosure. The insulation scrap removal assembly 160 includes an insulation scrap conveyor 162 and an insulation scrap saw assembly 164. The insulation scrap conveyor 162 can comprise, for example, chain-driven conveyors that move the scraps of insulation 10 thereon. In this way, the insulation scrap conveyor 162 can transport the scraps of insulation 10 thereon. The insulation scrap saw assembly 164 is positioned generally at an end of the insulation scrap conveyor 162.

The insulation scrap saw assembly 164 includes an insulation scrap saw 166 movably mounted on one or more insulation scrap saw tracks 168. The insulation scrap saw tracks 168 are arranged above the insulation scrap conveyor 162 (in the orientation shown in FIG. 1) and extend transversely to the insulation scrap conveyor 162. In this way, the insulation scrap saw 166 is movable on the insulation scrap saw tracks 168 across the insulation scrap conveyor 162. The insulation scrap removal assembly 160 lowers the insulation scrap saw 166 to engage the scraps of insulation 10 and moves the insulation scrap saw 166 across the insulation scrap conveyor 162 to cut the scraps of insulation 10 into smaller pieces. In some embodiments, the insulation scrap removal assembly 160 moves the insulation scrap saw 166 along the insulation scrap saw tracks 168 to cut the scraps of insulation 10 as the insulation scrap conveyor 162 moves the scraps of insulation 10 along the insulation scrap conveyor 162.

The insulation scrap removal assembly 160 also includes an insulation scrap container 169. The insulation scrap conveyor 162 continues to move the cut scraps of insulation 10 such that the cut scraps of insulation 10 are moved into the insulation scrap container 169. For example, the cut scraps of insulation 10 can fall from the insulation scrap conveyor 162 into the insulation scrap container 169. From there, the scraps of insulation 10 can be recycled back into the insulation loading station to be made into a batt of insulation and/or can be disposed of.

Figure 8:
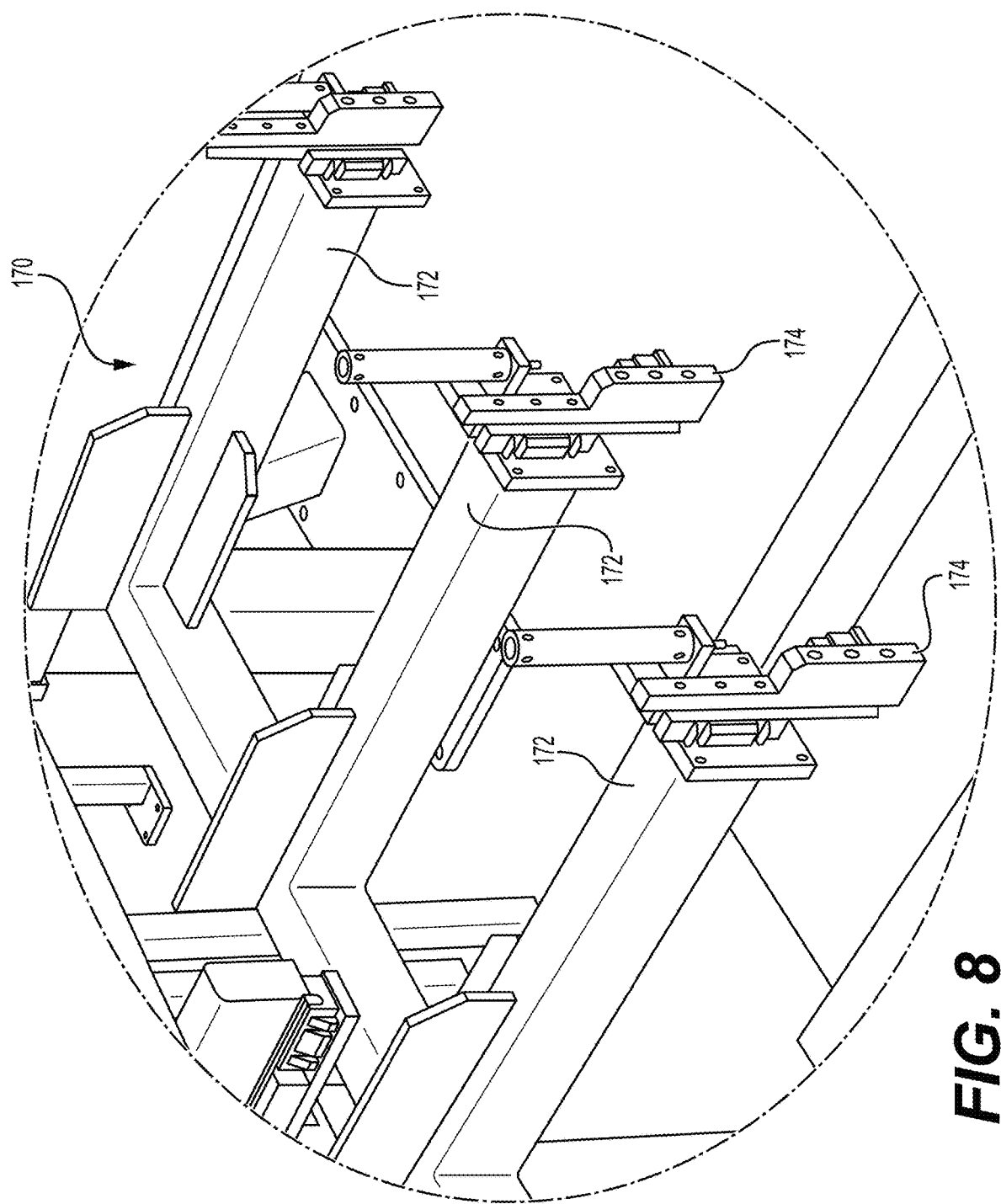
FIG. 8 is an enlarged view of a wall stop assembly of the insulation installation system, taken at detail 8 in FIG. 1, according to the present disclosure.

FIG. 8 is an enlarged view of the wall stop assembly 170 of the insulation installation system 100, taken at detail 8 in FIG. 1, according to the present disclosure. The wall stop assembly 170 includes one or more extendable wall stop devices 172. The extendable wall stop devices 172 include one or more wall pads 174 positioned at a distal end of the extendable wall stop devices 172. In operation, the wall structure moves along the wall conveyors 180 from the second end 103 towards the first end 101. The wall stop assembly 170 controls the extendable wall stop devices 172 towards the wall structure (e.g., towards the second end 103). In this way, the wall pads 174 engage the wall structure, and the wall stop assembly 170 ensures that the wall structure is properly positioned such that the insulation unload tool 150 can place the cut insulation 10 into the wall cavities of the wall structure. Accordingly, the insulation installation system 100 installs insulation 10 into the wall structure for insulating the wall structure. Thus, the present disclosure also provides a method 900 of installing insulation in a wall structure for a modular construction unit. The method 900 is detailed with respect to FIG. 9 below.

Figure 9:
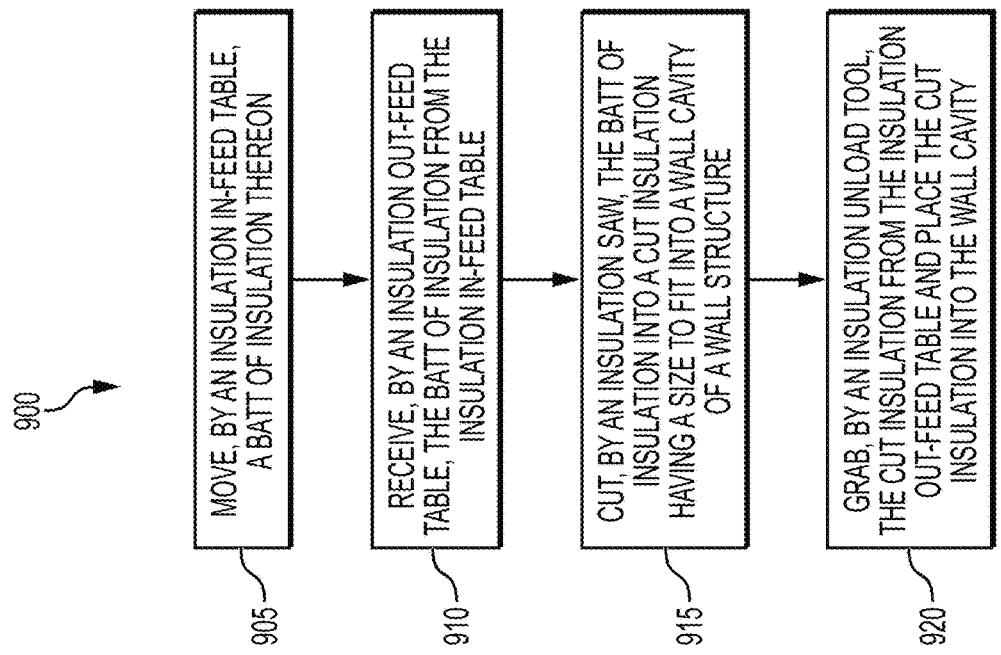
FIG. 9 is a flow diagram of a method of installing insulation in a wall structure for a modular construction unit, according to the present disclosure.

FIG. 9 is a flow diagram of a method 900 of installing insulation in a wall structure for a modular construction unit, according to the present disclosure. The method can proceed automatically, for example, by a processor (e.g., of the computing device 1000 of FIG. 10) controlling the insulation installation system 100.

In step 905, the method 900 includes moving, by the insulation in-feed table 120, a batt of insulation 10 thereon. In step 910, the method 900 includes receiving, by the insulation out-feed table 130, the batt of insulation 10 from the insulation in-feed table 120. In step 915, the method 900 includes cutting, by the insulation saw 142 of the insulation saw assembly 140, the batt of insulation 10 into a cut insulation 10 having a size to fit into a wall cavity of the wall structure. In step 920, the method 900 includes grabbing, by the insulation unload tool 150, the cut insulation 10 from the insulation out-feed table 130 and placing the cut insulation 10 into the wall cavity of the wall structure. The method 900 includes any of the operations detailed herein with respect to FIGS. 1 to 8, including in any order of the operations, or any combinations thereof.

Figure 10:
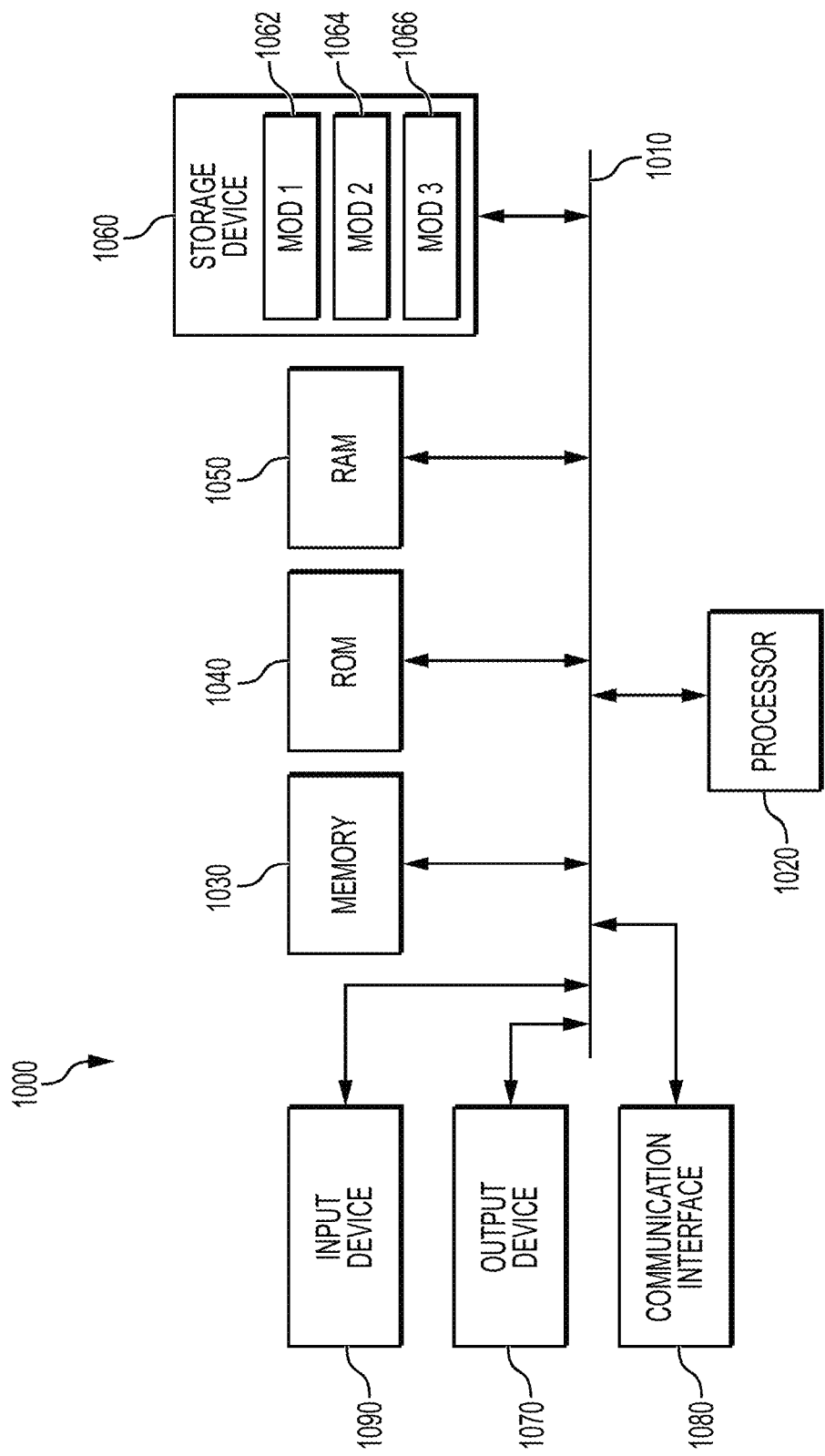
FIG. 10 illustrates a computing device for controlling aspects of the insulation installation system, according to the present disclosure.

FIG. 10 illustrates a computing device 1000 for controlling aspects of the insulation installation system 100, according to the present disclosure. The computing device 1000 can carry out instructions for controlling the components of the insulation installation system 100, such as, for example, the pallet removal robot 102, insulation load tool 110, the insulation in-feed table 120, the insulation out-feed table 130, the insulation saw assembly 140, the insulation unload tool 150, the insulation scrap removal assembly 160, the wall stop assembly 170, and the wall conveyor 180. While a single computing device 1000 is illustrated in FIG. 10, the insulation installation system 100 can include any number of computing devices 1000 for controlling the components thereof, and performing the method of installing insulation in the wall structure for the modular construction unit.

The computing device 1000 includes a processing unit (CPU or processor) 1020 and a system bus 1010 that couples various system components including a memory 1030 such as read-only memory (ROM) 1040 and random-access memory (RAM) 1050 to the processor 1020. The computing device 1000 can include a cache of high-speed memory connected directly with, in close proximity to, or integrated as part of the processor 1020. The computing device 1000 copies data from the memory 930 and/or the storage device 1060 to the cache for quick access by the processor 1020. In this way, the cache provides a performance boost that avoids processor 1020 delays while waiting for data. These and other modules can control or be configured to control the processor 1020 to perform various actions. Other memory 930 may be available for use as well. The memory 930 can include multiple different types of memory with different performance characteristics. It can be appreciated that the disclosure may operate on a computing device 1000 with more than one processor 1020 or on a group or cluster of computing devices networked together to provide greater processing capability. The processor 1020 can include any general-purpose processor and a hardware module or software module, such as module 1 1062, module 2 1064, and module 3 1066 stored in storage device 1060, configured to control the processor 1020 as well as a special-purpose processor where software instructions are incorporated into the actual processor design. The processor 1020 may essentially be a completely self-contained computing system, containing multiple cores or processors, a bus, memory controller, cache, etc. A multi-core processor may be symmetric or asymmetric.

The system bus 1010 may be any of several types of bus structures including a memory bus or memory controller, a peripheral bus, and a local bus using any of a variety of bus architectures. A basic input/output (BIOS) stored in ROM 1040 or the like, may provide the basic routine that helps to transfer information between elements within the computing device 1000, such as during start-up. The computing device 1000 further includes storage devices 1060 such as a hard disk drive, a magnetic disk drive, an optical disk drive, tape drive or the like. The storage device 1060 can include software modules 1062, 1064, 1066 for controlling the processor 1020. Other hardware or software modules are contemplated. The storage device 1060 is connected to the system bus 1010 by a drive interface. The drives and the associated computer-readable storage media provide nonvolatile storage of computer-readable instructions, data structures, program modules and other data for the computing device 1000. In one aspect, a hardware module that performs a particular function includes the software component stored in a tangible computer-readable storage medium in connection with the necessary hardware components, such as the processor 1020, system bus 1010, output device 1070, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computing device 1000 is a small, handheld computing device, a desktop computer, or a computer server.

Although the exemplary embodiment described herein employs the storage device 1060, other types of computer-readable media which can store data that are accessible by a computer, such as magnetic cassettes, flash memory cards, digital versatile disks, cartridges, random-access memories (RAMs) 1050, and read-only memory (ROM) 1040, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1000, an input device 1090 represents any number of input mechanisms, such as a microphone for speech, a touch-sensitive screen for gesture or graphical input, keyboard, mouse, motion input, speech and so forth. An output device 1070 can also be one or more of a number of output mechanisms known to those of skill in the art, such as, for example, a display. In some instances, multimodal systems enable a user to provide multiple types of input to communicate with the computing device 1000. The communications interface 1080 generally governs and manages the user input and system output. There is no restriction on operating on any particular hardware arrangement and therefore the basic features here may easily be substituted for improved hardware or firmware arrangements as they are developed.

Further aspects of the present disclosure are provided by the subject matter of the following clauses.

An insulation installation system for installing insulation in a wall structure for a modular construction unit, the insulation installation system comprising an insulation in-feed table that moves a batt of insulation thereon, an insulation out-feed table that receives the batt of insulation from the insulation in-feed table, an insulation saw assembly comprising an insulation saw that cuts the batt of insulation into a cut insulation having a size to fit into a wall cavity of the wall structure, and an insulation unload tool that grabs the cut insulation from the insulation out-feed table and places the cut insulation into the wall cavity of the wall structure.

The insulation installation system of the preceding clause, wherein the size of the cut insulation includes an insulation length of the cut insulation that is greater than a wall cavity length of the wall cavity and/or an insulation width of the cut insulation that is greater than a wall cavity width of the wall cavity.

The insulation installation system of any preceding clause, further comprising an insulation load tool that grabs the batt of insulation from a stack of insulation and places the batt of insulation onto the insulation in-feed table.

The insulation installation system of any preceding clause, further comprising a pallet removal robot, wherein the stack of insulation is on a pallet, and the pallet removal robot removes the pallet when the pallet is empty.

The insulation installation system of any preceding clause, wherein the insulation load tool includes an insulation grabbing tool comprising a static frame and one or more extendable arms that are slidably attached to the static frame, the insulation load tool retracting the one or more extendable arms about the batt of insulation to grab the batt of insulation, and extending the one or more extendable arms to release the batt of insulation onto the insulation in-feed table.

The insulation installation system of any preceding clause, wherein the insulation in-feed table includes an in-feed table conveyor having one or more in-feed table conveyor arms that move the batt of insulation thereon to move the batt of insulation towards the insulation out-feed table.

The insulation installation system of any preceding clause, wherein the insulation out-feed table includes one or more vertical stopper walls that stop the batt of insulation on the insulation out-feed table.

The insulation installation system of any preceding clause, wherein the insulation out-feed table includes an out-feed table conveyor having one or more out-feed table conveyor arms that move the batt of insulation thereon to move the batt of insulation towards the one or more vertical stopper walls.

The insulation installation system of any preceding clause, wherein the insulation saw assembly includes one or more insulation saw tracks, and the insulation saw is movably coupled on the one or more insulation saw tracks.

The insulation installation system of any preceding clause, wherein the insulation unload tool includes an insulation grabbing tool comprising a static frame and a plurality of frame arms coupled to the static frame, and the plurality of frame arms are spaced laterally to grab the cut insulation from the insulation out-feed table.

The insulation installation system of any preceding clause, further comprising an insulation scrap removal assembly that comprises an insulation scrap conveyor that moves scraps of insulation thereon, wherein the insulation unload tool grabs the scraps of insulation from the insulation out-feed table and places the scraps of insulation onto the insulation scrap conveyor.

The insulation installation system of any preceding clause, wherein the insulation scrap removal assembly further comprises an insulation scrap saw movably mounted on one or more insulation scrap saw tracks, and the insulation scrap saw cuts the scraps of insulation.

The insulation installation system of any preceding clause, wherein the insulation scrap removal assembly further comprises an insulation scrap container, and the scraps of insulation move into the insulation scrap container from the insulation scrap conveyor.

The insulation installation system of any preceding clause, further comprising a wall stop assembly comprising one or more extendable wall stop devices that move to engage the wall structure to stop the wall structure at a position for receiving the cut insulation in the wall cavity of the wall structure.

The insulation installation system of any preceding clause, further comprising one or more wall conveyors that move the wall structure thereon towards the insulation unload tool.

A method of installing insulation in a wall structure for a modular construction unit, the method comprising moving, by an insulation in-feed table, a batt of insulation thereon, receiving, by an insulation out-feed table, the batt of insulation from the insulation in-feed table, cutting, by an insulation saw of an insulation saw assembly, the batt of insulation into a cut insulation having a size to fit into a wall cavity of the wall structure, and grabbing, by an insulation unload tool, the cut insulation from the insulation out-feed table and placing the cut insulation into the wall cavity of the wall structure.

The method of the preceding clause, wherein the size of the cut insulation includes an insulation length of the cut insulation that is greater than a wall cavity length of the wall cavity and/or an insulation width of the cut insulation that is greater than a wall cavity width of the wall cavity.

The method of any preceding clause, further comprising grabbing, with an insulation load tool, the batt of insulation from a stack of insulation and placing the batt of insulation onto the insulation in-feed table.

The method of any preceding clause, wherein the stack of insulation is on a pallet, and the method further comprises removing, with an pallet removal robot, the pallet when the pallet is empty.

The method of any preceding clause, wherein the insulation load tool includes an insulation grabbing tool comprising a static frame and one or more extendable arms that are slidably attached to the static frame, and the method further comprises retracting the one or more extendable arms about the batt of insulation to grab the batt of insulation, and extending the one or more extendable arms to release the batt of insulation onto the insulation in-feed table.

The method of any preceding clause, wherein the insulation in-feed table includes an in-feed table conveyor having one or more in-feed table conveyor arms, and the method further comprises moving, with the one or more in-feed table conveyor arms of the in-feed table conveyor, the batt of insulation on the insulation in-feed table to move the batt of insulation towards the insulation out-feed table.

The method of any preceding clause, wherein the insulation out-feed table includes one or more vertical stopper walls, and the method further comprises stopping, with the one or more vertical stopper walls, the batt of insulation on the insulation out-feed table.

The method of any preceding clause, wherein the insulation out-feed table includes an out-feed table conveyor having one or more out-feed table conveyor arms, and the method further comprises moving, with the one or more out-feed table conveyor arms of the out-feed table conveyor, the batt of insulation on the insulation out-feed table to move the batt of insulation towards the one or more vertical stopper walls.

The method of any preceding clause, wherein the insulation saw assembly includes one or more insulation saw tracks, and the method further comprises moving the insulation saw along the one or more insulation saw tracks to cut the batt of insulation.

The method of any preceding clause, wherein the insulation unload tool includes an insulation grabbing tool comprising a static frame and a plurality of frame arms coupled to the static frame, and the method further comprises grabbing, with the plurality of frame arms, the cut insulation from the insulation out-feed table.

The method of any preceding clause, further comprising an insulation scrap removal assembly that comprises an insulation scrap conveyor, and the method further comprises grabbing, with the insulation unload tool, the scraps of insulation from the insulation out-feed table, placing the scraps of insulation on the insulation scrap conveyor, and moving the scraps of insulation on the insulation scrap conveyor.

The method of any preceding clause, wherein the insulation scrap removal assembly further comprises an insulation scrap saw movably mounted on one or more insulation scrap saw tracks, and the method further comprises moving the insulation scrap saw along the one or more insulation scrap saw tracks, and cutting, with the insulation scrap saw, the scraps of insulation.

The method of any preceding clause, wherein the insulation scrap removal assembly further comprises an insulation scrap container, and the method further comprises, moving, with the insulation scrap conveyor, the scraps of insulation move into the insulation scrap container.

The method of any preceding clause, further comprising moving one or more extendable wall stop devices of a wall stop assembly to engage the wall structure to stop the wall structure at a position for receiving the cut insulation in the wall cavity of the wall structure.

The method of any preceding clause, further comprising moving, with one or more wall conveyors, the wall structure thereon towards the insulation unload tool.

Although the foregoing description is directed to the preferred embodiments, it is noted that other variations and modifications will be apparent to those skilled in the art and may be made without departing from the disclosure. Moreover, features described in connection with one embodiment may be used in conjunction with other embodiments, even if not explicitly stated above.

The invention claimed is:

1. An insulation installation system for installing insulation in a wall structure for a modular construction unit, the insulation installation system comprising:
   an insulation in-feed table that moves a batt of insulation thereon;
   an insulation out-feed table that receives the batt of insulation from the insulation in-feed table;
   an insulation saw assembly comprising an insulation saw that cuts the batt of insulation into a cut insulation having a size to fit into a wall cavity of the wall structure; and
   an insulation unload tool that grabs the cut insulation from the insulation out-feed table and places the cut insulation into the wall cavity of the wall structure.

2. The insulation installation system of claim 1, wherein the size of the cut insulation includes an insulation length of the cut insulation that is greater than a wall cavity length of the wall cavity and/or an insulation width of the cut insulation that is greater than a wall cavity width of the wall cavity.

3. The insulation installation system of claim 1, further comprising an insulation load tool that grabs the batt of insulation from a stack of insulation and places the batt of insulation onto the insulation in-feed table.

4. The insulation installation system of claim 3, further comprising a pallet removal robot, wherein the stack of insulation is on a pallet, and the pallet removal robot removes the pallet when the pallet is empty.

5. The insulation installation system of claim 3, wherein the insulation load tool includes an insulation grabbing tool comprising a static frame and one or more extendable arms that are slidably attached to the static frame, the insulation load tool retracting the one or more extendable arms about the batt of insulation to grab the batt of insulation, and extending the one or more extendable arms to release the batt of insulation onto the insulation in-feed table.

6. The insulation installation system of claim 1, wherein the insulation in-feed table includes an in-feed table conveyor having one or more in-feed table conveyor arms that move the batt of insulation thereon to move the batt of insulation towards the insulation out-feed table.

7. The insulation installation system of claim 1, wherein the insulation out-feed table includes one or more vertical stopper walls that stop the batt of insulation on the insulation out-feed table.

8. The insulation installation system of claim 7, wherein the insulation out-feed table includes an out-feed table conveyor having one or more out-feed table conveyor arms that move the batt of insulation thereon to move the batt of insulation towards the one or more vertical stopper walls.

9. The insulation installation system of claim 1, wherein the insulation saw assembly includes one or more insulation saw tracks, and the insulation saw is movably coupled on the one or more insulation saw tracks.

10. The insulation installation system of claim 1, wherein the insulation unload tool includes an insulation grabbing tool comprising a static frame and a plurality of frame arms coupled to the static frame, and the plurality of frame arms are spaced laterally to grab the cut insulation from the insulation out-feed table.

11. The insulation installation system of claim 1, further comprising an insulation scrap removal assembly that comprises an insulation scrap conveyor that moves scraps of insulation thereon, wherein the insulation unload tool grabs the scraps of insulation from the insulation out-feed table and places the scraps of insulation onto the insulation scrap conveyor.

12. The insulation installation system of claim 11, wherein the insulation scrap removal assembly further comprises an insulation scrap saw movably mounted on one or more insulation scrap saw tracks, and the insulation scrap saw cuts the scraps of insulation.

13. The insulation installation system of claim 11, wherein the insulation scrap removal assembly further comprises an insulation scrap container, and the scraps of insulation move into the insulation scrap container from the insulation scrap conveyor.

14. The insulation installation system of claim 1, further comprising a wall stop assembly comprising one or more extendable wall stop devices that move to engage the wall structure to stop the wall structure at a position for receiving the cut insulation in the wall cavity of the wall structure.

15. The insulation installation system of claim 1, further comprising one or more wall conveyors that move the wall structure thereon towards the insulation unload tool.

16. A method of installing insulation in a wall structure for a modular construction unit, the method comprising:
- moving, by an insulation in-feed table, a batt of insulation thereon;
- receiving, by an insulation out-feed table, the batt of insulation from the insulation in-feed table;
- cutting, by an insulation saw of an insulation saw assembly, the batt of insulation into a cut insulation having a size to fit into a wall cavity of the wall structure; and
- grabbing, by an insulation unload tool, the cut insulation from the insulation out-feed table and placing the cut insulation into the wall cavity of the wall structure.

17. The method of claim 16, wherein the size of the cut insulation includes an insulation length of the cut insulation that is greater than a wall cavity length of the wall cavity and/or an insulation width of the cut insulation that is greater than a wall cavity width of the wall cavity.

18. The method of claim 16, further comprising grabbing, with an insulation load tool, the batt of insulation from a stack of insulation and placing the batt of insulation onto the insulation in-feed table.

19. The method of claim 18, wherein the stack of insulation is on a pallet, and the method further comprises removing, with an pallet removal robot, the pallet when the pallet is empty.

20. The method of claim 18, wherein the insulation load tool includes an insulation grabbing tool comprising a static frame and one or more extendable arms that are slidably attached to the static frame, and the method further comprises retracting the one or more extendable arms about the batt of insulation to grab the batt of insulation, and extending the one or more extendable arms to release the batt of insulation onto the insulation in-feed table.

21. The method of claim 16, wherein the insulation in-feed table includes an in-feed table conveyor having one or more in-feed table conveyor arms, and the method further comprises moving, with the one or more in-feed table conveyor arms of the in-feed table conveyor, the batt of insulation on the insulation in-feed table to move the batt of insulation towards the insulation out-feed table.

22. The method of claim 16, wherein the insulation out-feed table includes one or more vertical stopper walls, and the method further comprises stopping, with the one or more vertical stopper walls, the batt of insulation on the insulation out-feed table.

23. The method of claim 22, wherein the insulation out-feed table includes an out-feed table conveyor having one or more out-feed table conveyor arms, and the method further comprises moving, with the one or more out-feed table conveyor arms of the out-feed table conveyor, the batt of insulation on the insulation out-feed table to move the batt of insulation towards the one or more vertical stopper walls.

24. The method of claim 16, wherein the insulation saw assembly includes one or more insulation saw tracks, and the method further comprises moving the insulation saw along the one or more insulation saw tracks to cut the batt of insulation.

25. The method of claim 16, wherein the insulation unload tool includes an insulation grabbing tool comprising a static frame and a plurality of frame arms coupled to the static frame, and the method further comprises grabbing, with the plurality of frame arms, the cut insulation from the insulation out-feed table.

26. The method of claim 16, further comprising an insulation scrap removal assembly that comprises an insulation scrap conveyor, and the method further comprises grabbing, with the insulation unload tool, the scraps of insulation from the insulation out-feed table, placing the scraps of insulation on the insulation scrap conveyor, and moving the scraps of insulation on the insulation scrap conveyor.

27. The method of claim 26, wherein the insulation scrap removal assembly further comprises an insulation scrap saw movably mounted on one or more insulation scrap saw tracks, and the method further comprises moving the insulation scrap saw along the one or more insulation scrap saw tracks, and cutting, with the insulation scrap saw, the scraps of insulation.

28. The method of claim 26, wherein the insulation scrap removal assembly further comprises an insulation scrap container, and the method further comprises, moving, with the insulation scrap conveyor, the scraps of insulation move into the insulation scrap container.

29. The method of claim 16, further comprising moving one or more extendable wall stop devices of a wall stop assembly to engage the wall structure to stop the wall structure at a position for receiving the cut insulation in the wall cavity of the wall structure.

30. The method of claim 16, further comprising moving, with one or more wall conveyors, the wall structure thereon towards the insulation unload tool.

* * * * *